United States Patent [19]
Falk

[11] 4,455,051
[45] Jun. 19, 1984

[54] RATIO CONTROL VALVE FOR TRACTOR REAR AXLES

[75] Inventor: Edward J. Falk, St. Louis, Mo.

[73] Assignee: Echlin Inc., Branford, Conn.

[21] Appl. No.: 273,865

[22] Filed: Jun. 15, 1981

[51] Int. Cl.³ .............................. B60T 8/18; B60T 8/26
[52] U.S. Cl. .................................... 303/6 C; 188/349; 303/7; 303/28
[58] Field of Search .............. 303/6 C, 6 R, 7, 28–30, 303/9, 13, 40, 50–56, 118, 84; 137/102, 627.5; 60/591; 188/349

[56] References Cited

U.S. PATENT DOCUMENTS

| | | | |
|---|---|---|---|
| 3,183,042 | 5/1965 | Bueler | 303/54 X |
| 3,190,700 | 6/1965 | Fites | 303/7 |
| 3,459,000 | 8/1969 | Oberthür | 303/6 C |
| 3,603,648 | 9/1971 | Reznicek et al. | 303/6 C |
| 3,614,169 | 10/1971 | Bueler | 303/6 C |
| 3,677,606 | 7/1972 | Shutt | 303/6 C |
| 3,771,836 | 11/1973 | Bueler | 303/6 C |
| 3,964,794 | 6/1976 | Scholz | 303/6 C |
| 4,118,076 | 10/1978 | Mild | 303/28 X |
| 4,261,624 | 4/1981 | Plantan | 303/40 |
| 4,348,062 | 9/1982 | Koenig | 303/7 X |

Primary Examiner—Douglas C. Butler
Attorney, Agent, or Firm—Neuman, Williams, Anderson & Olson

[57] ABSTRACT

The invention relates to an improvement in a valve for a tractor air brake system for changing the pressure delivered to air brakes on a tractor rear axle during "bob tail" operation and particularly to a valve wherein the ratio is changed by communication of control pressure to a second control surface in accordance with the presence of trailer emergency pressure. The improved ratio control valve enables fluid pressure communication to both control surfaces of the ratio valve until a predetermined input pressure is reached so that the "crack-open" input pressure for both the "trailer-connected" and the "bob tail" modes of operation will be the same. Further in accordance with the invention, a blend-back valve is provided which is biased by the available fluid pressure in the tractor reservoir tank so that the maximum available tractor reservoir pressure may always be applied to the tractor rear axle brakes even when the trailer is operating in the "bob tail" mode.

5 Claims, 3 Drawing Figures

RATIO CONTROL VALVE FOR TRACTOR REAR AXLES

The invention relates to a ratio control valve. It relates particularly to a valve for changing the ratio of pressure transmitted to the rear axle brakes of a tractor vehicle in accordance with whether a trailer is connected thereto.

A copending application of Bueler Ser. No. 273,870 filed June 15, 1981, now U.S. Pat. No. 4,410,218. assigned to the same assignee herein, teaches a ratio control valve which solves the problem of varying the ratio of rear brake pressure from a 1:1 ratio, whenever the trailer is connected to the tractor, so that full braking torque is always available at the rear axles, to a reduced ratio, whenever the tractor is operating without the trailer, i.e. "bobtail". The valve therein is a binary control valve which utilizes pressure from the trailer emergency conduit to indicate the presence or absence of the trailer and to control in accordance with this signal the effective area of a reaction piston to be exposed to input service brake application i.e. control pressure. In addition, the valve disclosed therein has a blend-back capability for assuring that at high input pressures the output pressure will return to a 1:1 ratio with the input pressure so that an override of the reduced ratio may be accomplished.

While the valve disclosed therein solves the problem of varying the ratios of output pressure to input pressure, in accordance with whether the trailer is connected, it has been discovered that the operation of the valve disclosed therein may be significantly improved.

The valve disclosed in the related application requires a predetermined downward force on the reaction piston to initially overcome the spring force of the piston return spring to begin metering pressure to the rear brakes. The application pressure necessary to reach this initial point is termed "crack-open pressure". When fluid pressure communication is closed between the two control chambers of the known valve, i.e. when the trailer is disconnected, the effective area operated upon by the input application pressure is less than when there is open communication, thus it takes a greater initial input application pressure to "crack open" the valve when the communication is closed off.

Secondly, whenever the trailer is connected but trailer emergency pressure is lost, for instance, by rupture of the trailer emergency conduit, the trailer spring-set emergency brakes will set and the tractor protection valve will close off to protect the remaining tractor reservoir pressure. This reservoir pressure is typically much lower than the normal operating pressure. The ratio control valve will revert to the tractor-only mode of operation since pressure from the trailer emergency conduit will no longer be present. It is highly desirable that the tractor rear brakes cylinders have the capability of reaching 1:1 ratio with the front brakes even in this condition. It has been found that at these reduced reservoir pressures, with the known valve incorporated, the tractor rear brake cylinders may be operated only at the reduced pressure ratio so that there is a significant reduction in braking torque at the rear wheels over the available maximum even when brake application control pressure is fully applied as in a panic stop.

In accordance with the invention, the ratio control valve which responds to trailer signal pressure enables fluid pressure to communicate and to act against the first and second surfaces until a predetermined input pressure is reached. Thus, the "crack-open" pressure for both the "trailer-connected" and the "bobtail" mode will be the same. As a further advantage the split-point input pressure, i.e. the pressure at which proportioning operation begins, may be varied.

Further in accordance with the invention herein, the blend valve, instead of acting against a predetermined spring force as taught in the known ratio control valve, is biased into the closed position by reservoir pressure. The control pressure is then operative to initiate the blend back whenever the control pressure reaches a first predetermined proportion of the reservoir pressure and to open the blend back valve completely at a second higher predetermined pressure. Thus, a valve according to the invention will always provide a push-through capability regardless of the available reservoir pressure.

Further features and advantages of a valve in accordance with the invention will be seen in the description of the figures wherein.

Figure 1:
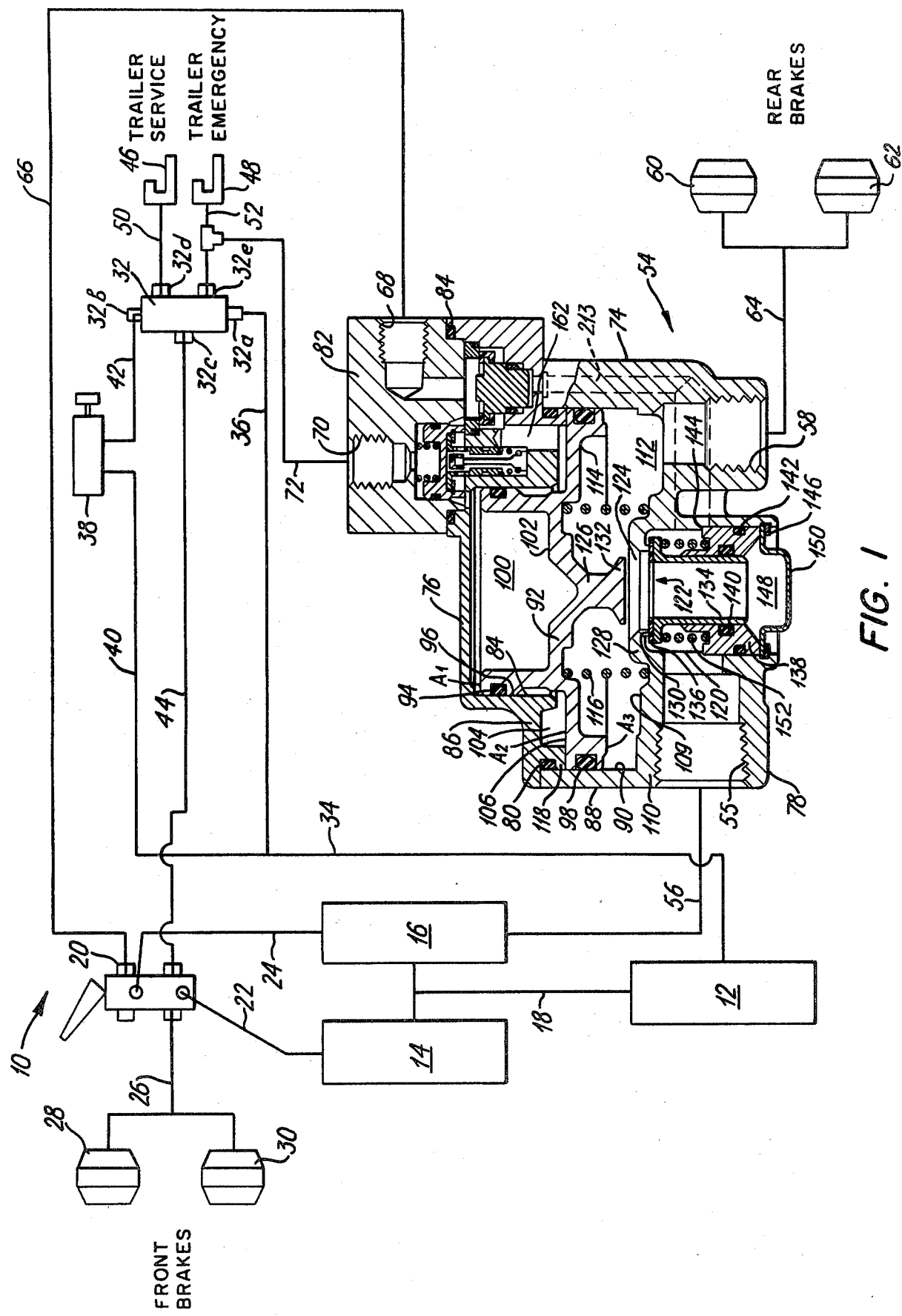
FIG. 1 is a brake system shown schematically with a valve according to the invention shown in vertical cross section incorporated therein.

Referring now to FIG. 1, a tractor brake system is shown generally at 10. A "wet" reservoir 12 is normally supplied with and stores fluid pressure from a compressor (not shown). Pressure from reservoir 12 is transmitted to "dry" reservoirs 14 and 16 through branching conduit 18. A conventional application valve 20 receives pressure from reservoirs 14 and 16 through conduits 22 and 24, respectively, for direct application of service braking pressure through branching conduit 26 to front brake cylinders 28 and 30.

A conventional tractor protection valve 32 is incorporated to receive fluid pressure at its tractor emergency port 32a through conduits 34 and 36. A push-pull valve 38 is connected to reservoir 12 through a branch conduit 40, for instance, and to the control port 32b of tractor protection valve 32 through conduit 42. The application valve 20 is connected to the service pressure port 32c of tractor protection valve 32 through conduit 44. Conventional glad-hand connectors 46 and 48 are connected to the trailer service port 32d and trailer emergency port 32e of trailer protection valve 32 by conduits 50 and 52, respectively. Gladhand connector 46 is adapted for connection to a mating trailer connector (not shown) to provide service (or control) air to the trailer system. Similarly gladhand connector 48 is adapted for mating with its counterpart on the trailer system (also not shown) to provide emergency (or supply) air.

A ratio control valve 54 according to the invention and described below receives fluid pressure at reservoir port 55 directly from reservoir tank 16 via conduit 56. Output pressure is transmitted from delivery port 58 to rear brake chambers 60 and 62 through branching conduit 64. Service brake application pressure is transmitted from application valve 20 through conduit 66 to control (or service) port 68 of valve 54. Trailer emergency signal port 70 is connected to receive trailer emergency pressure through conduit 72 which is "teed" into trailer emergency conduit 52.

The ratio control valve 54 comprises a housing 74 having an upper portion 76 and lower portion 78 connected together by conventional means (not shown) and sealed together by O-ring 80. A cap assembly 82 is affixed on the upper portion 76 and sealed thereto by O-ring 84 disposed therebetween. The upper portion 76 has a first bore 84. A flange portion 86 extending from the walls of this bore meets the walls 88 of the lower portion which walls form a larger second bore 90 in the lower portion 78. The combination of upper and lower portions thus forms a stepped bore with housing 74.

Stepped reaction piston 92 is movably disposed within the stepped bore 84,90. The stepped reaction piston has a first seal 94 at its peripheral surface 96 in contact with the walls of first bore 84 and a second seal 98 in contact with the walls of larger second bore 90.

The first seal 94 defines between itself and the top of upper part 76 a first chamber 100 in which a first pressure will act against a first surface 102 of step reaction piston 92. This first surface 102 has an effective area $A_1$. Between first seal 94 and second seal 98 of step reaction piston 92 is defined a second chamber 104 in which a second pressure will act against a second annular surface 106 of step piston 92. The annular surface 106 has an effective area $A_2$. It will be appreciated that any pressures in chambers 100 and 104 will create additive downward acting forces on reaction piston 92.

Surface portion 109 of bottom part 110 of lower housing portion 78 defines between itself and second seal 98 a third chamber 112 in which a third pressure will act against lower opposed surface 114 of reaction piston 92. This lower opposed surface 114 has an effective area $A_3$ wherein $A_1+A_2=A_3$. Piston return spring 116 is disposed between bottom portion 110 and reaction piston 92 to normally bias piston 92 upward in the unactuated position illustrated in FIG. 1 into abutment with shoulder 118 of flange 86.

Bottom portion 110 has an axial bore 120 in which is disposed an inlet-exhaust (pressure-delivery) valve described below shown generally at 122. Reservoir port 55 is in open fluid communication with bore 120 at all times.

Aperture 124 at the top of axial bore 120 allows downward passage of extension 126 of reaction piston 92 as the piston moves downwardly. The underside of lip 128 forming the aperture opening into axial bore 120 creates a valve seat 130 for the inlet valve portion of inlet-exhaust valve 122. Flange 132 of reaction piston extension 126 forms a valve seat for the exhaust portion of the inlet-exhaust valve 122.

The inlet-exhaust valve assembly 122 comprises an exhaust tube 134 having a flanged lip with annular resilient seal 136 at the top thereof. Exhaust tube 134 is slidably disposed in annular valve guide 138. O-ring 140 seals against the exhaust tube 134. The valve guide is sealed into the axial bore 120 by O-ring 142 and is held in position against small annular shoulder 144 by a snap ring 146. The lower end of exhaust tube 134 opens into exhaust port 148 which is protected by exhaust shield 150.

Spring 152 disposed between the lip of exhaust tube 134 and valve guide 138 normally biases exhaust tube 134 into the position illustrated in FIG. 1 where annular resilient seal 136 sealingly abuts valve seat 130 on aperture 124. In this position inlet-exhaust valve assembly 122 seals the reservoir port 55 from chamber 112. Chamber 112 is open to atmospheric pressure through exhaust tube 134. Delivery port 58 is in open fluid communication with chamber 112, so that in the position illustrated brake chamber 60 and 62 are also exhausted.

Downward movement of the extension 126 of reaction piston 92 through aperture 124 brings the flange 132 into sealing abutment with the resilient seal 136 to close the exhaust valve portion of inlet-exhaust valve 122. The closing of this valve portion seals chamber 112 against exhausting of pressure through exhaust tube 134. Further downward movement of reaction piston 92 forces the exhaust tube 134 downwardly against the force of spring 152 to remove seal 136 from the valve seat 130 to open fluid communication from the reservoir port 54 to chamber 112. As the pressure in chamber 112 begins to build toward full reservoir pressure, a force against surface 114 will be generated which will oppose the downward force on reaction piston 92. The pressure in chamber 112 will thus build to the point where the reaction piston moves upward to the position where the inlet valve 122 closes and piston 92 is force-balanced, i.e. in a position poised to move in either direction. The pressure in chamber 112 will be proportioned in accordance with the ratio of the upper effective area of piston 92 acted upon by input pressure to the opposed surface area of piston 92 acted on by pressure in chamber 112.

Figure 2:
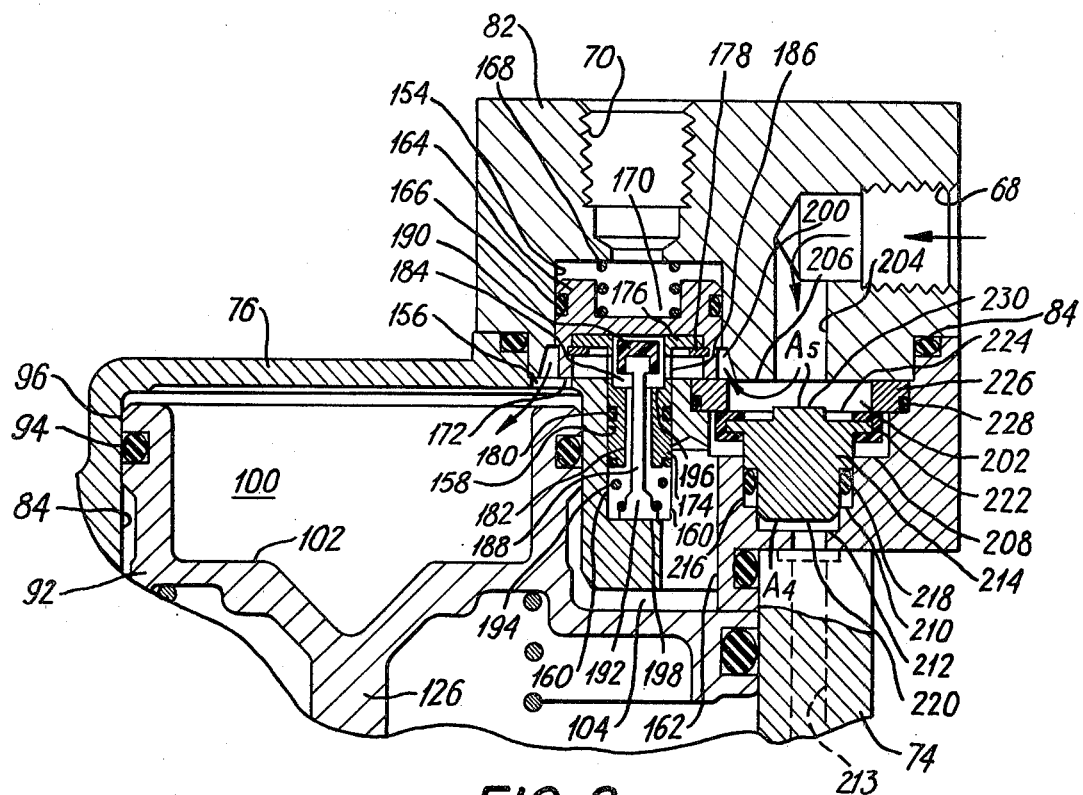
FIG. 2 is a detail of the cap assembly of FIG. 1.

As best seen in FIG. 2 which shows an enlarged view of the cap assembly portion of valve 54, trailer emergency signal port 70 is in fluid communication with the upper portion chamber 154. Lower portion of chamber 154 is always in open fluid communication with chamber 100 through aperture 156 therebetween. Blind bore 158 extends downwardly from chamber 154 to open at side portion 160 thereof into offset blind counterbore 162 which opens into chamber 104.

Ratio control piston 164 is movably disposed in chamber 154. The piston 164 carries annular seal 166 at the periphery thereof in contact with the walls of chamber 154. Spring 168 disposed between the top of chamber 154 and the bottom of cavity 170 in piston 164 normally biases piston 164 downward to the position shown in FIG. 2 to the point where it abuts against upper surface 172 of upper part 76.

Extension member 174 which is rigidly affixed to piston 164, suitably by means of a flange 176 of said extension member held thereto by snap ring 178, extends downwardly into bore 158 and is sealed at the periphery thereof by seal 180. Extension member 174 has an axial bore 182 extending through the length thereof which opens into small chamber 184 which is in fluid communication with lower portion of chamber 154 through aperture 186.

Small bore 182 receives a stem 188. The stem 188 enlarges to hold resilient seal 190 at the top thereof and expands at the lower part to form head 192. Spring 194 disposed between head 192 and extension member 174 acts to seat resilient seal 190 against shoulder 196 unless prevented by the abutment of head 192 with the end 198 of blind bore 158.

Preferably, chamber 154 has a groove 200 at the lower peripheral portion thereof for convenient air flow around piston 164.

Control port 68 in cap assembly 82 communicates service brake application pressure to chamber 202 through bore 204. Conveniently, groove 200 overlaps a peripheral portion of chamber 202 so that aperture 206 is created for open fluid communication between control port 68, aperture 206, grooves 200 and chamber 100. Preferably, chamber 202 is a stepped bore having successive shoulders 208, 210 and 212, and eventually ending in open communication with axial bore 120 through passage 213 of lower part 78 (shown in dashed lines) and hence to the available reservoir pressure from reservoir port 55.

Blend back valve piston 214 is movably disposed in chamber 202. Preferably, the piston 214 is stepped to slide within each successively smaller bore and is sealed at bore portion 216 by seal 218. Thus, reservoir pressure acting against the lower surfaces 220 of piston 214 act against an effective area $A_4$.

The top portion of piston 214 suitably has flange 222 holding annular resilient sealing means 224. In the position illustrated in FIG. 2, the resilient sealing means 224 sealing abuts against annular member 226 which is itself sealed at its periphery by O-ring 228. Pressure in lower portion of chamber 154 from the control port 68 will act against the top surface 230 of the piston against an effective area $A_5$. It will be appreciated that reservoir pressure acting against lower surfaces 220 of the piston 214 will cause piston 214 to move upward such that sealing means 224 is in sealing abutment with annular member 226 except when overcome by the downward acting force of pressure acting against upper surface 230 of piston 214.

The operation of the ratio control valve during bobtail operation will now be described. In bobtail operation, the push-pull valve 38 is actuated so that there is no pressure admitted to the control port 32b of tractor protection valve 32. The absence of pressure at 32b acts in the known manner to isolate the trailer supply conduit 52 from tractor pressure. Thus, no pressure is available at the emergency signal port 70.

When service application pressure is applied from application valve 20 to control port 68 the pressure is transmitted through bore 204 into chamber 202 and from thence through aperture 206, groove 200, aperture 156 into chamber 100. It will be appreciated that this route is always open regardless of the mode of operation. It will be further appreciated that the conventional reservoir pressure acting against the surface 220 of blend back piston 214 will initially close the path from chamber 202 to counterbore 162 for transmission of fluid pressure to chamber 104. However, in the position illustrated in FIG. 2 there is initially transmission of pressure through aperture 186, chamber 184, bore 182 and into counterbore 162 for communication with chamber 104. Thus, initially, there is open communication of input pressure into both chamber 100 and chamber 104. Thus, input pressure acts against the total available upper surface of the reaction piston 92. It will be appreciated that this condition will be maintained so long as there is open communication into chamber 104.

Figure 3:
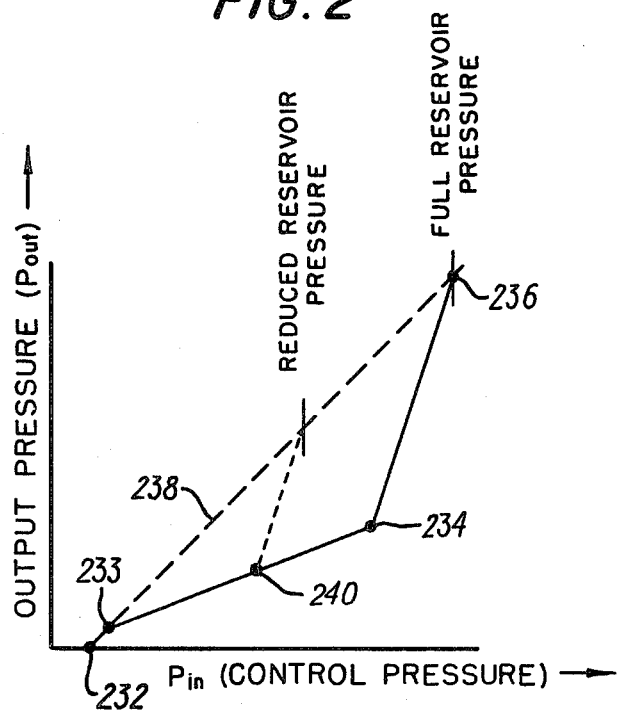
FIG. 3 is a graphical illustration of the operation of the valve in accordance with the invention.

Input pressure in the lower part of chamber 154 simultaneously starts to act on the underside portion of control piston 164. The piston 164 starts to move upward against the force of spring 168. Spring 194 continues to hold head 192 in abutment with the end of bore 198 so that as piston 164 moves to its uppermost position, resilient seal 190 seals against shoulder 196 to prevent further transmission of pressure into chamber 104. From this point onward, any further increases in air pressure act only on the first surface 102 of step reaction piston 92, that is, against an effective area $A_1$. Thus, as shown graphically in FIG. 3, there will be an initial predetermined input pressure shown as point 232 which corresponds to the "crack-open" point of the valve until at least which point input pressure will be available to both chamber 100 and chamber 104 and thereafter, when further pressure communication to chamber 104 is closed, a proportioned pressure output beginning at point 233 having a pressure ratio in known manner in accordance with the relationship $P_{out}=P_{in}(A_1/A_3)$ is initiated. It will be appreciated that the force of spring 168 will determine the precise pressure at which "knee-point" 233 will occur. This relationship will exist until the control pressure, i.e. $P_{in}$, becomes great enough to open blend valve at 224,226 (point 234).

The blend valve at 224,226 opens when the control pressure on area $A_5$ of the upper surface 230 of piston 214 overcomes the closing force existing because of the reservoir pressure acting on area $A_4$ of surface 220.

For higher pressure metering of air pressure past the blend valve into chamber 104 from chamber 202 through counterbore 162 changes the $P_{out}$ to $P_{in}$ relationship to $$P_{out} = \frac{P_{in}A_1 + P_B(A_2)}{A_3}$$

where $P_B$ equals the pressure in chamber 104.

This relationship will continue until $P_B$ becomes equal to $P_{in}$. This point is represented as 236 in FIG. 3. Until the input pressure reaches approximately reservoir pressure, the blend valve at 224,226 will meter pressure into chamber 104. Thus, the total reservoir pressure available for control at the control port 68 is always sufficient to overcome the closing force of piston 214 and thus is always available to be applied to chamber 104 at the high values of control input pressure.

The operation of the valve when the trailer is connected will now be described. The presence of supply pressure at signal port 70 will hold the ratio control piston 164 in the full downward position. Thus, resilient member 190 remains lifted from shoulder 196 so that in addition to the always open pathway from the control port 68 to chamber 100, there is always open communication as well into chamber 104. Control pressure entering control port 68 is therefore effective at all times on the total upper area $A_1+A_2=A_3$ of the step bore relay piston 92. This results in a $P_{out}$ to $P_{in}$ relationship of essentially $P_{out}=P_{in}$ in known manner due to the equal opposed areas of piston 92. This relationship is represented by line 238 of FIG. 3. This relationship prevails so long as the trailer is properly coupled to the tractor and so long as trailer emergency pressure is present at signal port 70. It will be appreciated at this point that the "crack-open" pressure for both modes of operation of the valve are substantially identical, since initially in both modes, the full upper control surfaces of piston 92 have pressure communication thereto.

In the event that trailer emergency pressure is lost, for instance, due to rupture of a trailer supply conduit, the trailer spring brakes will automatically apply. The tractor emergency valve 32 will act to isolate the loss of air at the trailer in order to protect the reservoir supply in the tractor. Thus, in this situation, there will no longer be pressure available at signal port 70 and consequently the ratio control valve 54 will revert to the tractor only ratio mode. As described above, the reduction in tractor reservoir pressure will reduce the force acting against the bottom surface 220 of the blend back piston 214. The blend valve opening point therefore shifts downwardly accordingly to assure the capability of applying the full remaining tractor reservoir pressure to the rear tractor brake chambers 60 and 62. The shifted blend back point is represented by point 240 of FIG. 3.

It will be understood that the claims are intended to cover all changes and modifications of the preferred embodiments of the invention, herein chosen for the purpose of illustration, which do not constitute departures from the spirit and scope of the invention.

What is claimed is:

1. A ratio control valve for a brake system of the type having a control pressure application valve for controlling brake pressure to tractor rear brakes and trailer service brakes, said trailer brakes receiving an independent supply pressure from said tractor brake system, said valve comprising:
   (a) a stepped reaction piston disposed in a housing, said reaction piston having a first surface defining a first effective area, a second surface defining a second effective area, and a third opposed surface defining a third opposed effective area;
   (b) an inlet-exhaust valve;
   (c) said reaction piston being movable in response to said control pressure acting against said first and second surfaces to operate said inlet-exhaust valve for metering independent reservoir pressure to said tractor rear brakes, said metered pressure also being applied to said third surface for force balancing of said reaction piston to control the metering of pressure;
   (d) passage means for the ingress of control pressure to act upon said first surface;
   (e) a check valve for controlling the application of said control pressure to said second surface;
   (f) said check valve being opened and closed by the displacement of an emergency signal piston connected thereto;
   (g) said piston being displaceable to a position for opening said check valve whenever the trailer supply pressure is present;
   (h) said emergency signal piston being displaceable into a position for closing said check valve in the absence of the trailer supply pressure; p1 (i) resilient means for biasing said emergency signal piston into the check valve open pisition until a first predetermined control pressure is reached; and
   (j) a blend back valve means for controlling the application of pressure to said second surface above a second predetermined control pressure whenever said check valve is closed; said blend back valve means being biased into closed position by the force of the independent reservoir pressure acting upon a blend back valve piston connected to said blend back valve means.

2. A ratio control valve comprising:
   (a) a stepped reaction piston disposed in a housing, said reaction piston having a first surface defining a first effective area, a second surface defining a second effective area, and a third opposed surface defining a third opposed effective area;
   (b) a pressure delivery valve;
   (c) said reaction piston being movable in response to input pressure against said first and second surfaces to operate said pressure delivery valve;
   (d) said pressure delivery valve being adapted for metering an independent reservoir pressure to at least one brake chamber, the metered pressure also being applied to said third surface for force balancing said reaction piston for control of the metering of pressure to said brake chamber;
   (e) means for applying variable control pressure to said first surface;
   (f) a check valve for controlling the application of said variable control pressure and being operable in response to the position of a signal piston, said signal piston receiving the available pressure in a trailer emergency signal port for opening and closing said check valve in response to the pressure thereon; and
   (g) resilient means for enabling said control pressure application to said second surface by biasing said signal piston to a position for opening said check valve when said control pressure is below a predetermined value and for disabling said control pressure application to said second surface by biasing said signal piston to a position for closing said check valve when said control pressure is above a predetermined value.

3. The ratio control valve of claim 2 further comprising a blend back valve means for controlling the application of pressure to said second surface above the predetermined control pressure whenever said means for controlling the application of control pressure is in position for preventing application of pressure to said second surface.

4. The ratio control valve of claim 3 wherein said blend-back valve means further comprises piston means operative to bias said blend-back valve means into a closed position by fluid pressure on said piston means and for holding said blend-back valve means closed until a predetermined value of control pressure is reached.

5. The valve of claim 4 wherein the pressure for biasing said piston means of said blend-back valve means is the independent reservoir pressure available.

* * * * *